Jan. 10, 1950     S. DARLINGTON     2,494,036

DIFFERENTIAL ANALYZER

Filed Sept. 20, 1947     2 Sheets-Sheet 1

INVENTOR
S. DARLINGTON
BY
*D. MacKenzie*
AGENT

Jan. 10, 1950

S. DARLINGTON 2,494,036

DIFFERENTIAL ANALYZER

Filed Sept. 20, 1947

INVENTOR
S. DARLINGTON
BY *D. MacKenzie*
AGENT

Patented Jan. 10, 1950

2,494,036

UNITED STATES PATENT OFFICE 2,494,036

DIFFERENTIAL ANALYZER

Sidney Darlington, Summit, N. J., assignor to Bell Telephone Laboratories, Incorporated, New York, N. Y., a corporation of New York Application September 20, 1947, Serial No. 775,287

4 Claims. (Cl. 235—61)

This invention relates to an improved electrical differential analyzer, particularly adapted to obtain the running solution of an equation of the form $$V(t) = \frac{P_1}{P_2} E(t)$$

In this equation, $E(t)$ may be a voltage representing a quantity which is a known function of time, $P_1$ and $P_2$ are expressions involving various powers in the operator $$p = \frac{d}{dt}$$

while $V(t)$ is a voltage representing a quantity also a function of time and known to be continuously related to the first function as stated in the equation.

Illustratively, $$\frac{P_1}{P_2}$$

may be the relation between output voltage, $V(t)$, of a network and the input voltage thereto, $E(t)$; in this case the invention permits the continuous determination of $V(t)$ when $E(t)$ is given.

It is therefore the object of the invention to provide a system of electrical and electromechanical apparatus for the automatic solution of a differential equation involving a single variable.

When in the expression $$\frac{P_1}{P_2}$$

the coefficients of the various powers of $p$ are all constants, the electromechanical components may be omitted from the system of the invention, their places being taken by electrical components.

Therefore, another object of the invention is to provide an electrical system for the automatic solution of a differential equation, with constant coefficients, in a single variable.

The description which follows is of a preferred embodiment of the invention, and is to be read with reference to the accompanying drawings, in which:

Fig. 1 is a diagram of a circuit for the solution of an equation of the form $$V = \frac{P_1}{P_2} E$$

of which the symbols have been above defined;

In all figures, like numerals and letters indicate like elements.

It is convenient at the outset to mention the sources of various known devices which occur in some or all of the figures in the accompanying drawings. Reversing amplifiers, identified by the symbol RA, are well known; they include each a vacuum tube in a conventional circuit of unit gain providing an output voltage equal but opposite in polarity to an input voltage. Summing amplifiers, $\Sigma A$, are the invention of K. D. Swartzel, Jr., disclosed in United States Patent 2,401,779, June 11, 1946. Electrical differentiators, D, are the summing amplifiers of Swartzel modified to provide an output voltage which is the time derivative of the sum of the input voltages; a suitable modification is the invention disclosed in United States Patent 2,412,227, December 10, 1946, to H. G. Och and K. D. Swartzel, Jr. Alternatively to the differentiators D, one may use an amplifier, conventionally stabilized by a feedback resistor variable for gain adjustment, and apply to the input circuit through a condenser the voltage to be differentiated; such differentiation through a condenser is disclosed by E. S. L. Beale et al. in United States Patent 2,251,973, August 12, 1941. Servomotors, designated S, may be of any convenient type of which many are known; direct current servomotor circuits are shown for example by J. A. Rey and by F. A. H. Harlé in United States Patents 1,086,729, February 10, 1914 and 1,268,712, June 4, 1918; the shaping of potentiometer cards so that the brush voltage is a desired function of the brush position is disclosed by P. A. Borden in United States Patent 2,114,330, April 19, 1938.

Figure 1:
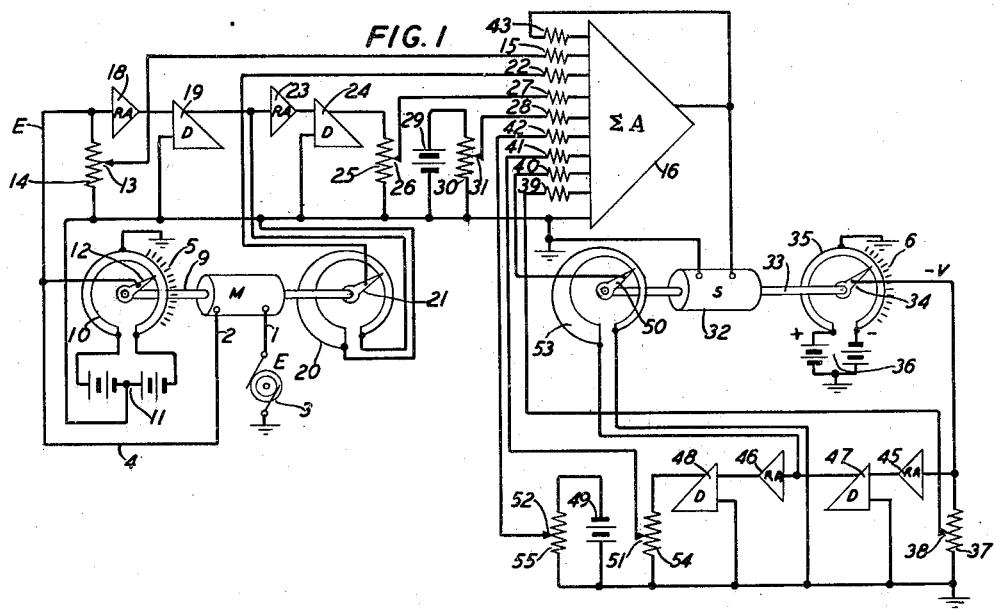

Referring now to Fig. 1, the equation to be dealt with is $$V = \frac{P_1}{P_2} E$$

where as above-mentioned may be a quantity varying with time and the P's are expressions involving $$p = \frac{d}{dt}, \ p^2 = \frac{d^2}{dt^2}$$

etc. For illustration there is chosen the case where the equation is of the second degree:

$$a_1 E + b_1 pE + c_1 p^2 E + d_1 = a_2 V + b_2 pV + c_2 p^2 V + d_2$$

the coefficients are assumed to be positive.

Figure 2:
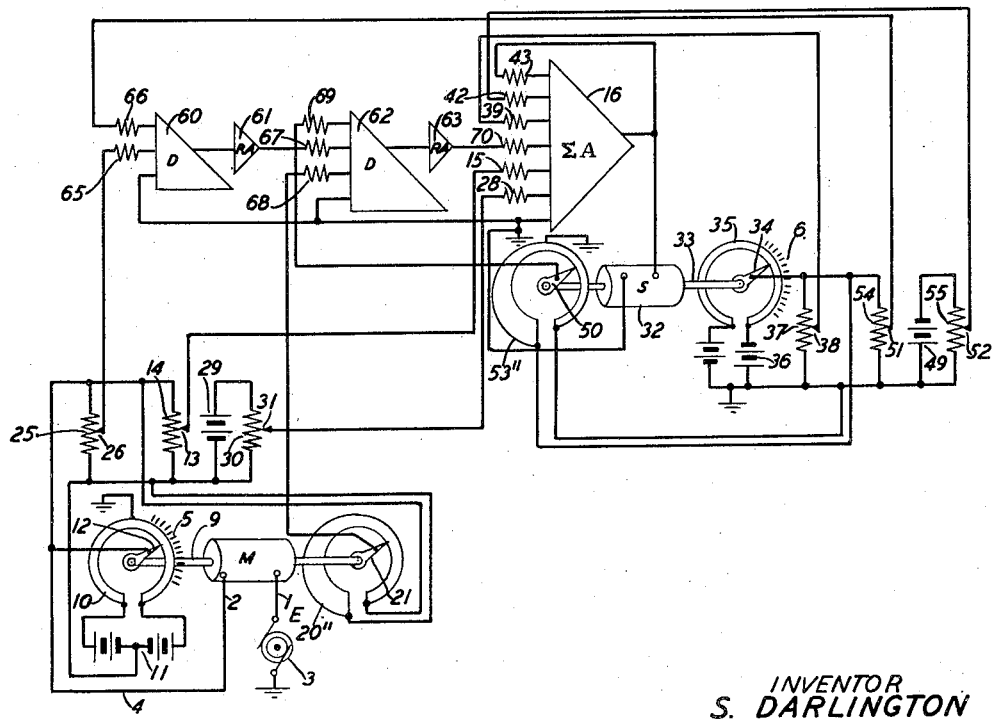
Fig. 2 is a circuit diagram alternative to that of Fig. 1.

In Figs. 1 and 2, $b_1$ and $b_2$ will be represented as functions of E and of V, defined by the positions, respectively, of brush 21 on potentiometer 20 and of brush 50 on potentiometer 53, which symbolize each an arbitrary function. On linear potentiometer 10 shunting battery 11, brush 12 is set by shaft 9 so driven by motor M that its angular position continuously represents the quantity E; to effect this, terminals 1 and 2 of motor M are supplied respectively with a voltage proportional to E, derived in any convenient way and symbolized by generator 3, and with the voltage E via conductor 4 from brush 12. Motor M then rotates shaft 9 to keep the voltage between terminals 1 and 2 zero. Brush 12 is thus made to derive a voltage to ground continuously proportional to E; this voltage is fractionated proportinally to $a_1$ by tap 13 handset on potentiometer 14, and this fractional voltage $a_1E$ is applied through resistor 15 to the input of summing amplifier 16. Through reversing amplifier 18 the voltage $-E$ is fed to differentiator 19 from which the voltage $$\frac{dE}{dt} = pE$$

is applied across potentiometer 20, which may be non-linear as shown. On this potentiometer, brush 21 is also driven by motor M to select the voltage $b_1pE$ which through resistor 22 is supplied to the input of summing amplifier 16. In like manner, through reversing amplifier 23, differentiator 24, potentiometer 25 and handset tap 26, the voltage $pE$ is again differentiated and a voltage $c_1p^2E$ is obtained and supplied to the input of amplifier 16 through resistor 27. Through resistor 28, amplifier 16 receives a voltage $d_1$ from battery 29, potentiometer 30 and handset tap 31. The voltage E may at any time be read on scale 5 concentric with potentiometer 10.

Servomotor 32 is supplied from the output circuit of amplifier 16 and drives shaft 33 concentric with circular potentiometer 35 which shunts battery 36. Insulated from and carried by shaft 33 is brush 34 selecting on potentiometer 35 from battery 36 a voltage which is to be proportional to V, the solution of the equation, which may be read on scale 6.

The voltage at brush 34 is applied across potentiometer 37 from which handset tap 38 applies a fractional voltage $-a_2V$ through resistor 39 to the input of amplifier 16. To that input are supplied also voltages $-b_2pV$, $-c_2p^2V$ and $-d_2$ through resistors 40, 41 and 42, respectively. These voltages are obtained through the operation of reversing amplifiers 45 and 46, differentiators 47 and 48, and battery 49, through tap 50 (the setting of which varies with shaft 33 and so with V), and handset taps 51 and 52 on potentiometers 53, 54 and 55 (of which 53 may be non-linear as shown) in the same manner as the corresponding functions of E and the voltage $d_1$. The output connection from amplifier 16 to motor 32 is so made that shaft 33 is continuously driven to a position where the total input voltage to amplifier 16 is zero, thereby making the magnitude of the voltage at brush 34 continuously proportional to V, which may be read on scale 6 concentric with potentiometer 35. As in all servomotor circuits, for a given polarity of driving voltage the motor may be connected to rotate in the desired direction. Amplifier 16 is stabilized by reverse feedback through resistor 43.

It is clear that by increasing the number of differentiators and reversing amplifiers in either branch, terms of higher order in E or in V may be introduced, and further that both negative and positive values of E and of V are provided for. Obvious changes may be made to provide for negative coefficients, and for other variations of coefficients with E and V besides the dependence of $b_1$ on E and $b_2$ on V.

Since the differentiators of Fig. 1 are the summing amplifiers of Swartzel modified to provide output voltages which are the negative time derivatives of the total respective input voltages, the circuit of Fig. 1 may be modified to the alternative form shown in Fig. 2, with a considerable economy of apparatus.

In Fig. 2, batteries 11 and 36 are shunted as in Fig. 1 by potentiometers 10 and 35 with the respective taps 12 and 34 whereby voltages E and $-V$ are obtained. The constant terms $d_1$ and $-d_2$ are derived from batteries 29 and 49 and supplied through resistors 28 and 42 to the input of amplifier 16. Motor 32 is controlled by the output voltage of amplifier 16 to drive shaft 33 carrying brush 34. Taps 13 and 38, respectively, supply to amplifier 16 the input voltages $a_1E$ via resistor 15 and $-a_2V$ via resistor 39. Potentiometers 20 and 53 of Fig. 1 are replaced respectively by potentiometers 20'' and 53'', which differ from them only as to shaping. The changes in shape produce new potentiometer ratios corresponding to new coefficients $b_1''$, $b_2''$ which are related to $b_1$, $b_2$ by $$b_1'' = \frac{1}{E}\int_0^E b_1 dE$$

$$b_2'' = \frac{1}{V}\int_0^V b_2 dV$$

These relations are chosen in order that $p(b_1''E)$ and $p(b_2''E)$ will be equal respectively to $b_1pE$ and $b_2pV$. Fractional voltages $b_1''E$ and $c_1E$ are obtained from taps 21 and 26, $-b_2''V$ and $-c_2V$ from taps 50 and 51, and from these the required time derivatives are produced by differentiators 60 and 62 with reversing amplifiers 61 and 63. Voltages $c_1E$ and $-c_2V$ are fed through resistors 65 and 66 to differentiator 60, from which the output voltage $-c_1pE+c_2pV$ is taken to reversing amplifier 61, thence to differentiator 62 through resistor 67.

Voltages $b_1''E$ and $-b_2''V$ are supplied to differentiator 62 via resistors 68 and 69. The total input voltage to differentiator 62 is thus $$b_1''E + c_1pE - b_2''V - c_2pV$$

the differentiator output is then reversed by reversing amplifier 63 and via resistor 70 the input circuit of amplifier 16 receives the voltage $b_1pE + c_1p^2E - b_2pV - c_2p^2V$. The total input voltage of amplifier 16 is thus the same as in the circuit of Fig. 1 and the operation of motor 32 again moves brush 34 to select the voltage $-V$. The circuit of Fig. 2 thus uses half as many differentiators and reversing amplifiers as does that of Fig. 1, requiring ten input resistors where eight were used in the previous figure, to solve the same equation of the second degree in $p$. The necessary additions to deal with equations of higher degree in $p$ are obvious.

Figure 3:
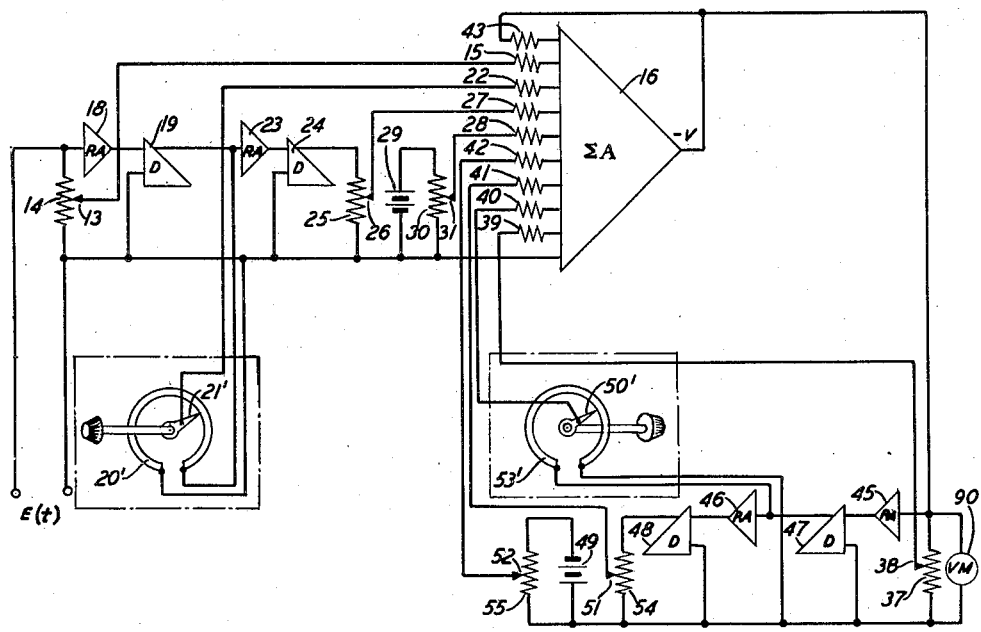
Fig. 3 is a circuit diagram similar to that of Fig. 1 but dispensing with the motors there shown.

When the coefficients of the various powers of $p$ are all constants, servomotor 32 may be omitted and the output $-V$ of summing amplifier 16 directly impressed across potentiometer 37, as shown in Fig. 3, corresponding to Fig. 1. In Fig. 3, non-linear potentiometer 53 and motor-driven brush 50 are replaced by linear potentiometer 53' and handset tap 50'. Likewise, non-linear potentiometer 20 and motor-driven brush 21 are replaced by linear potentiometer 20' and handset tap 21'. Obviously, the omission of servomotor 32 is equally possible when only the coefficients $a_2$, $b_2$ and $c_2$ are constants, leaving the terms in E to be derived as in Figs. 1 and 2. In either case, the voltage $-V$ is read by suitable means, such as voltmeter 90 across potentiometer 37. The input voltage $E(t)$ across resistor 14 in Fig. 3 corresponds to the voltage E, also a function of time, across resistor 14 of Fig. 1, and the reading on voltmeter 90 varies with time to show continuously the solution of the equation. Similar modifications in the circuit of Fig. 2 are obviously possible when the coefficients are constant. Coefficients can also be made to depend on elapsed time, in an arbitrary manner, by using shaped potentiometers with brushes driven by a constant speed motor.

What is claimed is:

1. A system of apparatus for solving a differential equation of the form $$V = \frac{P_1}{P_2}E$$

where E is a given quantity, $P_1$ and $P_2$ are each a polynomial in the operator $$p = \frac{d}{dt}$$

and V is the solution desired, comprising means for establishing a voltage $e_1$ proportional to E, controllable means for establishing a variable voltage $e_2$, a summing amplifier having an input and an output circuit, means including a plurality of differentiators for applying to the input circuit voltages individually proportional to the terms of the expression $P_1e_1$ together with voltages individually negatively proportional to the terms of the expression $P_2e_2$, whereby the voltage of the output circuit is proportional to $P_1e_1+P_2e_2$, and means for applying the output voltage to control the controllable means so to vary the voltage $e_2$ as to reduce the output voltage to the minimum value required to cause the controllable means to maintain $e_2$ negatively proportional to V.

2. Apparatus for the solution of a differential equation of the form $$V = \frac{P_1}{P_2}E$$

in which E is the magnitude of a given quantity, $P_1$ and $P_2$ are each a polynomial in the operator $$p = \frac{d}{dt}$$

and V is the quantity for which the equation is to be solved, comprising means for establishing a first voltage proportional to E, a first group of differentiating means for successively differentiating the first voltage with respect to time, computing means for deriving voltages proportional to the several terms of $P_1E$ from the first voltage and its successive differential voltages, a summing amplifier having an input circuit and an output circuit, means for combining in the input circuit of the amplifier the voltages corresponding to the terms of $P_1E$, a servomotor driven from the output circuit of the amplifier and controlling potentiometric means for establishing a second voltage, a second group of differentiating means for successively differentiating the second voltage with respect to time, computing means for deriving voltages negatively proportional to the several terms of $P_2V$ from the second voltage and its successive differential voltages and means for combining in the input circuit of the amplifier the voltages corresponding to the terms of $P_2V$ with those corresponding to the terms of $P_1E$ whereby the servomotor is driven to establish by the potentiometric means a voltage negatively proportional to V.

3. Apparatus for the solution of a differential equation of the form $P_1E=P_2V$, where E is a given quantity, $P_1$ and $P_2$ are polynomials in the operator $$p = \frac{d}{dt}$$

and V is the solution desired, comprising a source of voltage, means including electrical differentiators for deriving from the source a sum of voltages individually proportional to the terms of $P_1E$, a source of variable voltage, means including electrical differentiators for deriving from the second-named source a sum of voltages individually negatively proportional to the terms of $P_2V$, means for comparing the two sums and means controlled by the comparing means for controlling the variable voltage to make numerically equal the sums, whereby the variable voltage is made negatively proportional to V.

4. Apparatus for the solution of a differential equation including a given term independent of the dependent variable in the equation comprising a first and a second source of voltage, means for deriving from the first source a first voltage proportional to the given term, controllable means for deriving from the second source a variable voltage, means including electrical differentiators for deriving from the variable voltage a plurality of voltages individually proportional to the terms of the equation other than the given term, means for summing the first voltage with the plurality of voltages and means operated by the summing means for driving the controllable means to derive from the second source a voltage such that the net voltage sum becomes substantially zero, whereby the variable voltage is made proportional to the solution in the same ratio as the first voltage is proportional to the given term.

SIDNEY DARLINGTON.

REFERENCES CITED

The following references are of record in the file of this patent:

UNITED STATES PATENTS

| Number | Name | Date |
|---|---|---|
| 1,315,539 | Carson | Sept. 9, 1919 |
| 2,233,415 | Hull | Mar. 4, 1941 |
| 2,414,430 | Nisbet | Jan. 14, 1947 |